United States Patent [19]

Murata

[11] Patent Number: 4,824,211

[45] Date of Patent: Apr. 25, 1989

[54] METHOD OF DRIVING A LIQUID CRYSTAL DISPLAY DEVICE

[75] Inventor: Tetsuo Murata, Tenri, Japan

[73] Assignee: Sharp Kabushiki Kaishi, Osaka, Japan

[21] Appl. No.: 134,597

[22] Filed: Dec. 18, 1987

Related U.S. Application Data

[63] Continuation of Ser. No. 80,175, Jul. 31, 1987, abandoned, which is a continuation of Ser. No. 759,068, Jul. 24, 1985, abandoned.

[30] Foreign Application Priority Data

Aug. 3, 1984 [JP] Japan ............................... 59-163987

[51] Int. Cl.$^4$ ......................... G02F 1/133; G09G 3/36

[52] U.S. Cl. .................................... 350/332; 340/784; 340/805; 350/330

[58] Field of Search ................ 350/332, 330; 340/784, 340/805

[56] References Cited

U.S. PATENT DOCUMENTS

| | | | |
|---|---|---|---|
| 3,955,187 | 5/1976 | Bigelow | 340/784 |
| 4,378,557 | 3/1983 | Murata | 350/332 |
| 4,380,008 | 4/1983 | Kawakami et al. | 340/784 |
| 4,604,617 | 8/1986 | Morozumi | 340/784 |

*Primary Examiner*—John K. Corbin
*Assistant Examiner*—Martin Lerner
*Attorney, Agent, or Firm*—Flehr, Hohbach, Test, Albritton & Herbert

[57] ABSTRACT

A method of driving a liquid crystal display device by a voltage averaging method comprises the step of operating this device at a bias ratio which is larger than the theoretically optimum bias ratio for the device so that unevenness in contrast is reduced.

2 Claims, 3 Drawing Sheets

METHOD OF DRIVING A LIQUID CRYSTAL DISPLAY DEVICE

This is a continuation of application Ser. No. 080,175 filed July 31, 1987 which in turn is a continuation of application Ser. No. 759,068 filed July 24, 1985, both now abandoned.

This invention relates to a method of driving a liquid crystal display device and more particularly to a voltage averaging method of driving a liquid crystal display device by which unevenness in contrast can be reduced in the case of a high-duty driving of a liquid crystal display device of a dot matrix type, etc. by making the bias ratio of the applied voltage waveform greater than the theoretically optimum bias ratio.

A liquid crystal display device is a capacitive load and there are many kinds of resistance between its display section and the large scale integrated circuit for driving the liquid crystal device such as the ON-state resistance of the circuit, resistance on the substrate and resistance of the transparent conductive layer within the liquid crystal display device. For this reason, the charging and discharging currents when a voltage is applied to the device distort the driving waveforms at individual display points due to the capacitance C of the liquid crystal layer and the resistance R of the electrode wiring, etc. Let us consider a serially connected R-C-E circuit as shown in FIG. 2 in order to explain the phenomenon described above. If we assume that the circuit is closed at t=0 and consider the voltage V across the terminals of C, we obtain $$Ri+(1/C)\int i\,dt=E$$

where i is the current so that $$i=dq/dt$$

and q is the static charge accumulated on C. From the two equations given above, we obtain the following differential equation:

$$R\,dq/dt+q/C=E$$

which has a solution $$q=A\exp(-t/CR)+CE$$

where A is a constant but since q=0 at t=0, $$A=-CE.$$

Thus, $$q=CE[1-\exp(-t/CR)]$$

and hence $$V=E[1-\exp(-t/CR)]. \quad \text{Eq. (1)}$$

FIG. 3 shows the voltage V according to Eq. (1).

Since a liquid crystal display device and its driving circuit may be equivalently considered as an R-C-E series circuit, distortions appear in terminal voltage of the liquid crystal display device at each display point as illustrated in FIG. 4. As shown in FIG. 5, there are both a low-frequency waveform (a) and a high-frequency waveform (b) in a voltage waveform applied to the liquid crystal layer, depending on the contents to be displayed. When the applied voltage waveform becomes distorted, FIG. 4 makes it clear that the fractional lowering of the effective voltage value is greater for the high-frequency waveform than for the low-frequency waveform. As a result, contrast becomes lower at a display point where a high-frequency waveform is applied than where a low-frequency waveform is applied. In the case of a liquid crystal display device of a dot matrix type, this causes unevenness in contrast in the display pattern. Such unevenness in contrast caused by distortions in high-frequency waveforms has been common among the conventional liquid crystal display devices, presenting a serious problem from the point of view of the display quality.

It is therefore an object of the present invention in view of the above to provide a liquid crystal display device with reduced unevenness in contrast and improved display quality.

The above and other objects of the present invention are attained by providing a method of driving a liquid crystal display device by a voltage averaging method wherein the bias ratio is made larger than the theoretically optimum bias ratio so that the unevenness in contrast can be reduced and the quality of display is improved.

Figure 6:
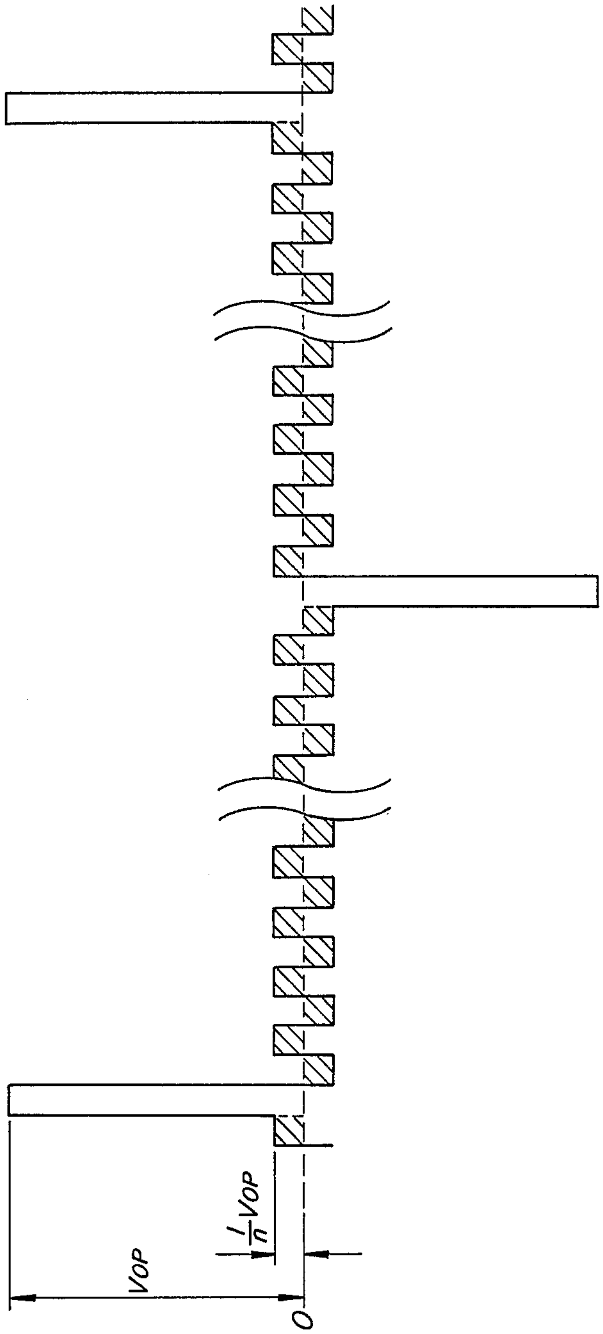
FIG. 6 is a diagram of a voltage waveform applied to a liquid crystal layer.

Reference being made to FIG. 6, there is shown an example of waveform applied to a liquid crystal layer (ON-state waveform). The shaded areas represent the part which is influenced by the waveform distortion. This part therefore becomes the principal cause of unevenness in contrast. The waveform value of this part is determined by the power source voltage $V_{op}$ and the bias ratio n.

The optimum bias ratio $n_s$ of a voltage waveform applied to the liquid crystal layer is obtainable from the duty ratio D. By the optimum bias ratio is meant the bias ratio that maximizes the ratio of effective values of the ON-state waveform and the OFF-state waveform for a constant duty ratio.

The optimum bias ratio is calculated as follows. Since the effective value of the ON-state waveform is $$V_{onrms}=(V_{op}/n)[(n^2+D-1)/D]^{\frac{1}{2}} \quad \text{Eq. (2)}$$

and that of the OFF-state waveform is $$V_{offrms}=(V_{op}/n)[\{(n-2)^2+D-1\}/D]^{\frac{1}{2}} \quad \text{Eq. (3)}$$

The ratio of effective values between the ON- and OFF-state waveforms is $$\alpha=[(n^2+D-1)/\{(n-2)^2+D-1\}]^{\frac{1}{2}}. \quad \text{Eq. (4)}$$

Thus, $\alpha$ assumes its smallest value when $n=1+D^{\frac{1}{2}}$. The bias value in this situation is therefore the optimum bias ratio when waveform distortions are not taken into consideration or $$\text{Optimum bias ratio } n_s=1+D^{\frac{1}{2}} \quad \text{Eq. (5)}$$

where D is the duty ratio.

Let us next consider a situation where the bias ratio is made larger than the optimum bias ratio. Eq. (2) shows that $V_{op}$ then must also be increased because an effective value of the ON-stage voltage necessaryfor the liquid crystal layer would otherwise not be applied. If the bias ratio is made larger, the crest value of the unselected waveform shown by the shade in FIG. 6 which causes the unevenness in contrast becomes small when the same effective ON-state value is applied and the fractional reduction in the effective voltage value due to the waveform distortion becomes smaller. Eq. (1) shows that the voltage value of waveform distortion is $V'=E-V=E\exp(-t/CR)$ and hence is proportional to the crest value E.

In summary, the effect on the effective value of the waveform distortion of the shaded unselected waveform region of FIG. 6 which causes the unevenness in contrast can be reduced by increasing the bias ratio. It is not desirable, however, to increase the bias ratio excessively because if the bias ratio is made larger than the theoretically optimum bias ratio (Eq. (5)), $\alpha$ as defined by Eq. (4) becomes small and the source voltage $V_{op}$ becomes high. We have found empirically that the bias ratio should be about 1.2–4 times the theoretically optimum bias ratio.

Figure 1A:
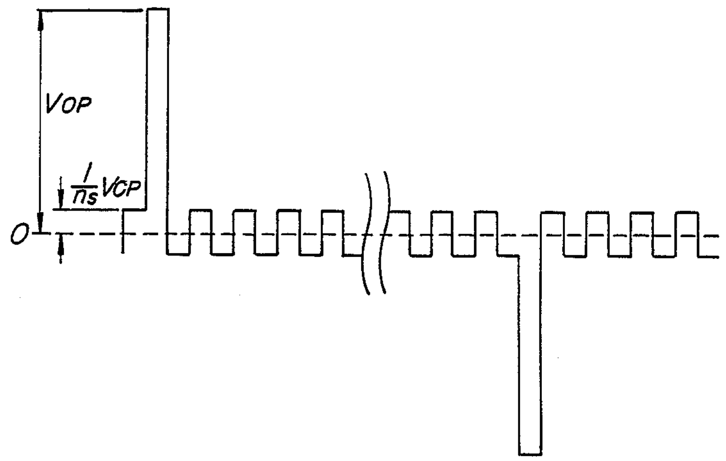
FIG. 1a. PRIOR ART
FIG. 1(*a*) is a voltage form applied to a liquid crystal layer by a conventional driving method and FIG. 1(*b*) is a voltage form applied to a liquid crystal layer by a driving method of this invention.
Figure 1B:
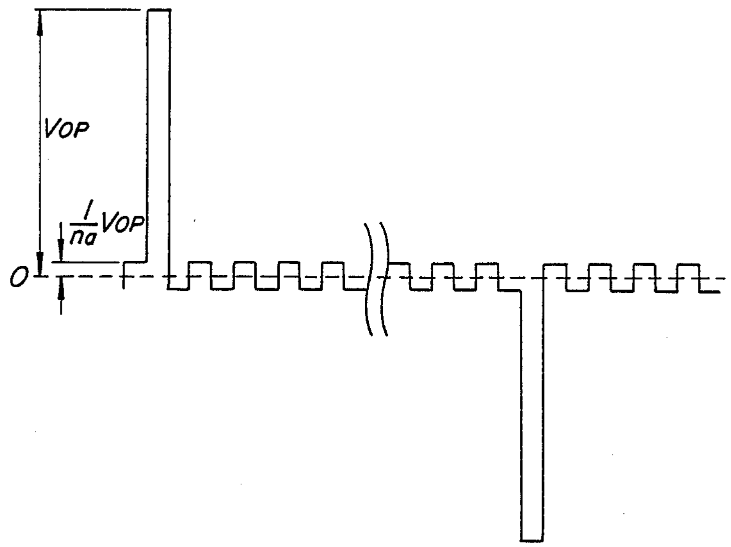
FIG. 1b. PRIOR ART
Figure 2:
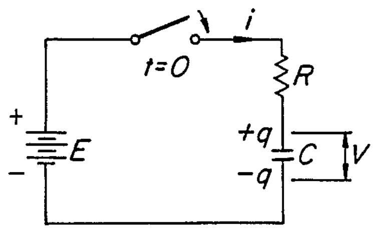
FIG. 2 is a circuit diagram of an R-C-E series circuit.
Figure 3:
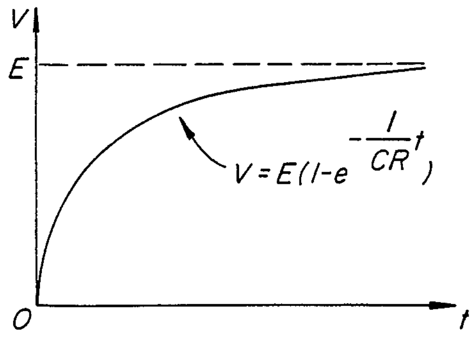
FIG. 3 is a curve showing the change with time of the voltage V across the capacitor C of FIG. 2.
Figure 4:
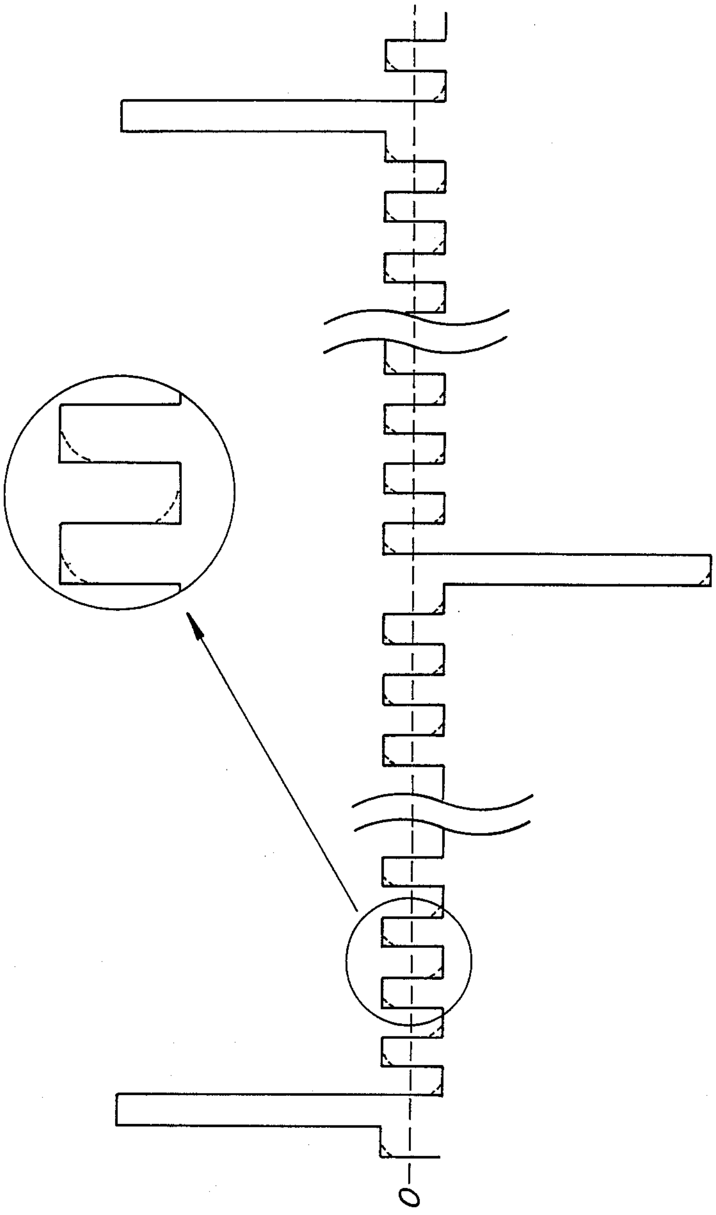
FIG. 4 is a waveform diagram which shows distortions of the voltage waveform applied to a liquid crystal layer.
Figure 5B:
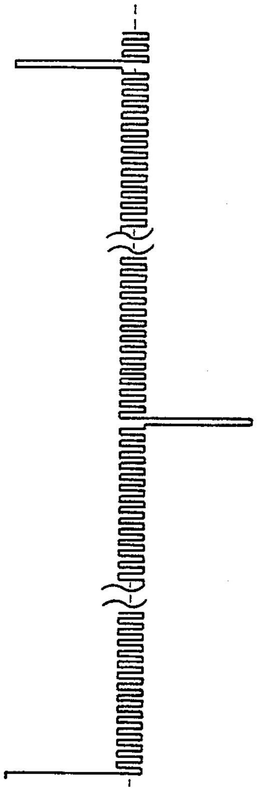
FIG. 5(*a*) is a low-frequency voltage waveform applied to a liquid crystal layer and FIG. 5(*b*) is a high-frequency voltage waveform applied to a liquid crystal layer.
Figure 5A:
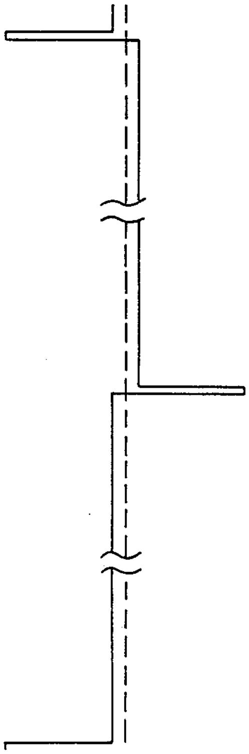

FIG. 1(*a*) shows a voltage waveform applied to the liquid crystal in a conventional manner (bias ratio n=optimum bias ratio $n_s$). FIG. 1(*b*) shows a voltage waveform applied to the liquid crystal layer according to the present invention (bias ratio $n_a$=1.2–4 times the optimum bias ratio $n_s$).

When D=200, the theoretically optimum bias ratio is $1+200^{\frac{1}{2}}$, or about 15.1. Let us consider now as an example a liquid crystal device operated at D=200, $n=n_x=15.1$ and $V_{op}=25$ V. In this situation, we obtain from Eqs. (2), (3) and (4)

$$V_{onrms}=(25/15.1)[(15.1^2+200-1)/200]^{\frac{1}{2}}=2.491,$$

$$V_{offrms}=(25/15.1)[\{(15.1-2)^2+200-1\}/200]^{\frac{1}{2}}=2.254$$

and $$\alpha=2.491/2.254=1.073.$$

We next change the value of n within the aforementioned range of 1.2–4 times the optimum bias ratio and set, for example, n=24. If we operate the same liquid crystal device under this new condition but without changing the OFF-state display level, the source voltage becomes higher to $V_{op}=29.3$ V. Eqs. (2), (3) and (4) give in this situation $$V_{onrms}=(29.3/24)[(24^2+200-1)/200]^{\frac{1}{2}}=2.403,$$

$$V_{offrms}=(29.3/24)[\{24-2)^2+200-1\}/200]^{\frac{1}{2}}=2.256$$

and $$\alpha=2.403/2.256=1.065.$$

Although this value of $\alpha$ is smaller, it was experimentally observed that unevenness in contrast became practically negligible when n was changed from 15.1 to 24. It has also been confirmed experimentally that those new values (n=24 and $V_{op}=29.3$ V) are within a practically feasible range in view of the characteristics of the liquid crystal materials which are currently in use.

The method of this invention is particularly effective in high duty cases. Since the effects of waveform distortions are complicatedly dependent on the electrode wiring resistance of the liquid crystal display device, the impedance of the driving circuit, the capacitance of the liquid crystal layer, the driving frequency, etc., it is desirable to determine the bias ratio while observing the quality of actual display and comparing both the ON-OFF contrast and the unevenness in contrast.

In general, each display section of a liquid crystal display device forms a parallel plate capacitor composed of a pair of transparent electrodes disposed opposite to each other and a dielectric liquid crystal layer. Moreover, the resistance of the conductive sections for applying voltages to these display sections is not negligible. Thus, it inevitably takes the form of a C-R integration circuit which causes distortions of waveforms. Conventionally, it was considered necessary to reduce the resistance of transparent electrodes in order to eliminate such causes of waveform distortions. The film thickness of the transparent electrodes was therefore increased, thus causing inevitably an increase in the production cost. The present invention makes it possible, however, to reduce the unevenness in contrast due to waveform distortions without reducing the resistance of transparent electrodes and to provide good display quality.

What is claimed is:

1. A method of reducing unevenness in contrast in driving a liquid crystal display device at a high duty ratio by voltage averaging, said method comprising the step of operating said device at a bias ratio 1.2–4 times as large as the theoretically optimum bias ratio of said liquid crystal display device.

2. The method of claim 1 wherein said device is driven at a duty cycle of about 1/200.

* * * * *